United States Patent
Barnett et al.

(10) Patent No.: US 7,839,589 B2
(45) Date of Patent: Nov. 23, 2010

(54) WRITE CURRENT WAVEFORM ASYMMETRY COMPENSATION

(75) Inventors: Raymond Elijah Barnett, Apple Valley, MN (US); Scott Gary Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/805,928

(22) Filed: Mar. 22, 2004

(65) Prior Publication Data

US 2005/0207053 A1 Sep. 22, 2005

(51) Int. Cl.
*G11B 5/09* (2006.01)
(52) U.S. Cl. .................................................. 360/46
(58) Field of Classification Search ................ 360/46, 360/68
See application file for complete search history.

(56) References Cited

U.S. PATENT DOCUMENTS

| 6,496,317 | B2 * | 12/2002 | Lacombe | 360/68 |
| 7,035,027 | B2 * | 4/2006 | Barnett et al. | 360/46 |
| 7,372,649 | B2 * | 5/2008 | VanEaton et al. | 360/46 |
| 2002/0151839 | A1 | 10/2002 | Landau | |
| 2003/0081339 | A1 * | 5/2003 | Barnett et al. | 360/67 |
| 2003/0151839 | A1 * | 8/2003 | Ikuma et al. | 360/46 |

* cited by examiner

*Primary Examiner*—Daniell L Negrón
(74) *Attorney, Agent, or Firm*—Dawn V. Stephens; Wade James Brady, III; Frederick J. Telecky, Jr.

(57) ABSTRACT

A write current circuit (300, 400) adapted to drive a thin film write head (202) of a mass media information storage device. The write current circuit (300, 400) further includes programming circuitry (311, 411) driven such that parameters of the write current waveform can be varied, including the write current overshoot amplitude and/or overshoot duration. The present invention achieves technical advantages by providing the ability to program out or adjust for system introduced asymmetries in the write current waveform.

17 Claims, 5 Drawing Sheets

WRITE CURRENT WAVEFORM ASYMMETRY COMPENSATION

FIELD OF THE INVENTION

The present invention relates to media information storage and, more particularly, to a programmable write current overshoot amplitude and duration asymmetry correction technique.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by the arm and interconnect 16 which comprise a read head 18 and a write head 20 at the tip thereof. The conventional read head 18 and write head 20 comprise magneto-resistive read head and thin-film inductive write head adapted to read or write data from/to platters 12 when current is passed through them. Arm and interconnect 16 are coupled to preamplifier 26 that serves as an interface between read/write heads 18/20 of disk/head assembly 10 and SSD channel 28. The preamp 26 provides amplification to the waveform data signals as needed for both read and write operations. A preamp 26 may comprise a single chip or may comprise separate components rather than residing on a single chip.

The magnetic flux transitions on the magnetic platter 12 are created by switching the write current polarity through the write head 20. The faster the write current switches polarity, the faster the change of the magnetic flux, and consequently more bits per inch can be stored in the media. To decrease the transition time of the media, an overshoot current is employed with the write driver signal.

Further, write signals are designed with a symmetrical differential voltage swing during the write current reversal period. Symmetrical common-mode voltage swing is also desirable but not required. Symmetrical differential voltage swings create a symmetric current response in the inductive load if there are no imbalances in the interconnect leading to the write head. However, in a real system the read head interconnect is adjacent to the write head interconnect on the arm 16 thus creating an imbalanced interconnect due to one of the differential write traces being physically close to one of the differential reader traces. When symmetrical differential voltage swings are driven from the preamp an asymmetrical write current waveform appears at the write head 18 load due to the interconnect imbalance.

Particular areas for improvements of write driver current circuits used to drive a thin film head include addressing the system induced imbalances of the write current, and providing the ability to change the write currents waveform shape so that these positive and negative amplitude and duration signal aspects can be customized. Accordingly, there is desired an improved write driver current circuit which can provide a symmetrical write current in an environment with induced imbalances, and positive and negative signal aspects selectively customized for optimizing disk drive performance.

SUMMARY

The present invention achieves technical advantages as a system and method for correcting the inherent imbalance associated with the read/write head interconnect which causes unbalanced loading on the write data path in which this unbalanced loading induces an asymmetry in the write current waveform. A write current circuit adapted to drive a thin film write head of a mass media information storage device further including programming circuitry driven such that parameters of the write current waveform can be varied, including the write current overshoot amplitude and/or overshoot duration.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
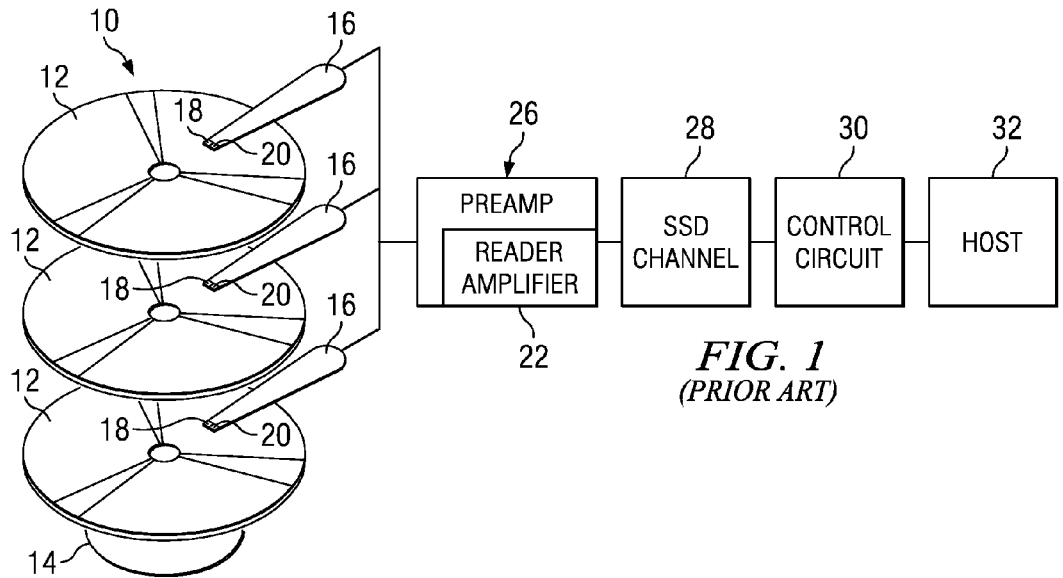
FIG. 1 illustrates a conventional disk drive system.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Figure 2A:
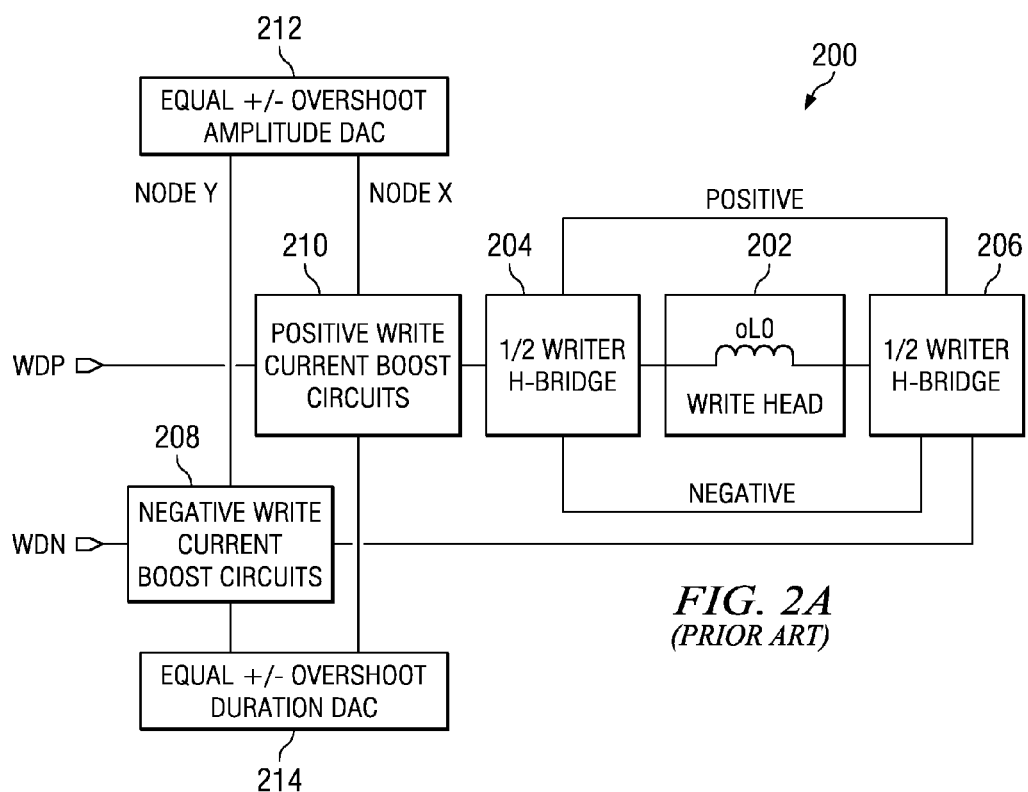
FIG. 2A illustrates a conventional write driver circuit.

Referring now to FIG. 2A there is illustrated a simplified H-bridge type circuit typically used for driving current through a write head 202 in a hard disk drive system. The purpose of the H-bridge is to enable current to be driven through the write head in either direction in which the H-bridge includes both a positive 204 and negative 206 side as is known in the art. The simplified circuit also includes an write current overshoot amplitude DAC 212 coupled to the conventional write driver circuitry 208, 210 for controlling the write current overshoot amplitude equally for each of the positive 204 and negative 206 portions of the H-bridge. Also included is a write current overshoot duration DAC 214 coupled to the conventional write driver circuitry 208, 210 for controlling the write current overshoot duration equally for each of the positive 204 and negative 206 portions of the H-bridge.

Figure 2B:
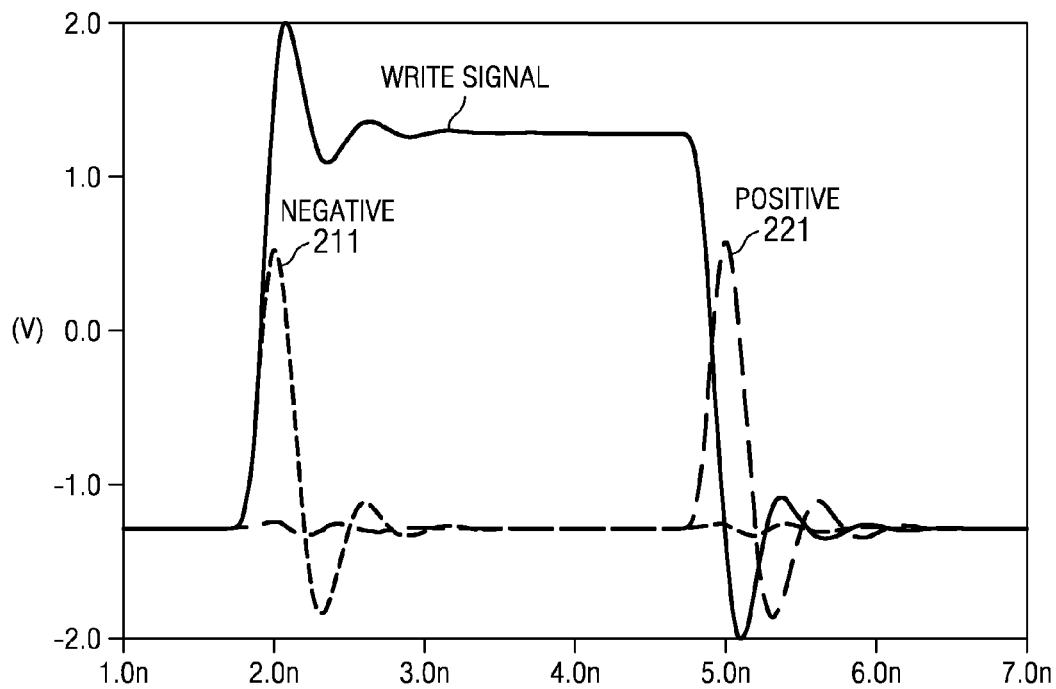
FIG. 2B shows a graphical representation of a write signal with symmetrical positive and negative write current overshoot as well as the equal amplitude write current pulsing signals 211/221 as seen at node X and node Y on FIG. 2A.

Referring now to FIG. 2B there is shown the write current overshoot amplitude pulsing signals, seen at node X and Node Y on FIG. 2A, typically used with the circuit shown in FIG. 2A to equally generate the positive and negative write current overshoots amplitudes. As shown and described above, separate signals 211 and 221 are used to generate the positive edge and the negative edge write current overshoot amplitude. Conventionally, the amplitudes of the signals are designed to be equal in order to create a nice symmetrical write current overshoot amplitude.

Figure 2C:
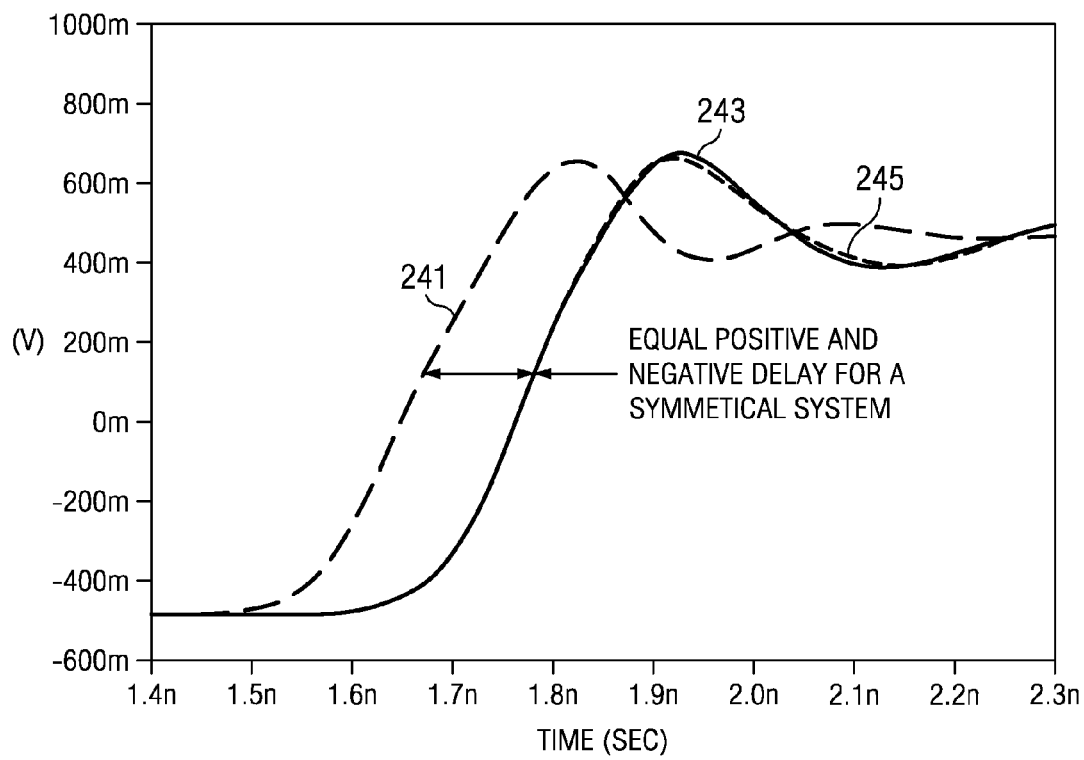
FIG. 2C shows a graphical representation of equally delayed positive and negative write current overshoot duration signals for a symmetrical positive and negative write current overshoot duration signal.

Referring now to FIG. 2C there is shown positive edge and negative edge write current overshoot duration control signals that are internal signals to block 208 and 210 on FIG. 2A, used to equally generate the positive and negative write current overshoot durations. As shown and described above, separate signals 243 and 245 are equally delayed versions of the reference signal 241 and used to generate the positive edge and the negative edge write current overshoot duration. Conventionally, the delay of the duration control signals are designed to be equal in order to create a nice symmetrical write current overshoot durations.

An exemplary embodiment of the present invention comprises an individually positive edge and negative edge adjustable write current overshoot amplitude which enables a user to program out or adjust for system introduced asymmetries in the amplitude of the write current overshoot waveform. And, a further embodiment includes an individually positive and negative edge adjustable duration circuit enabling write current overshoot duration asymmetry adjustments which further improves overall system performance.

Figure 3A:
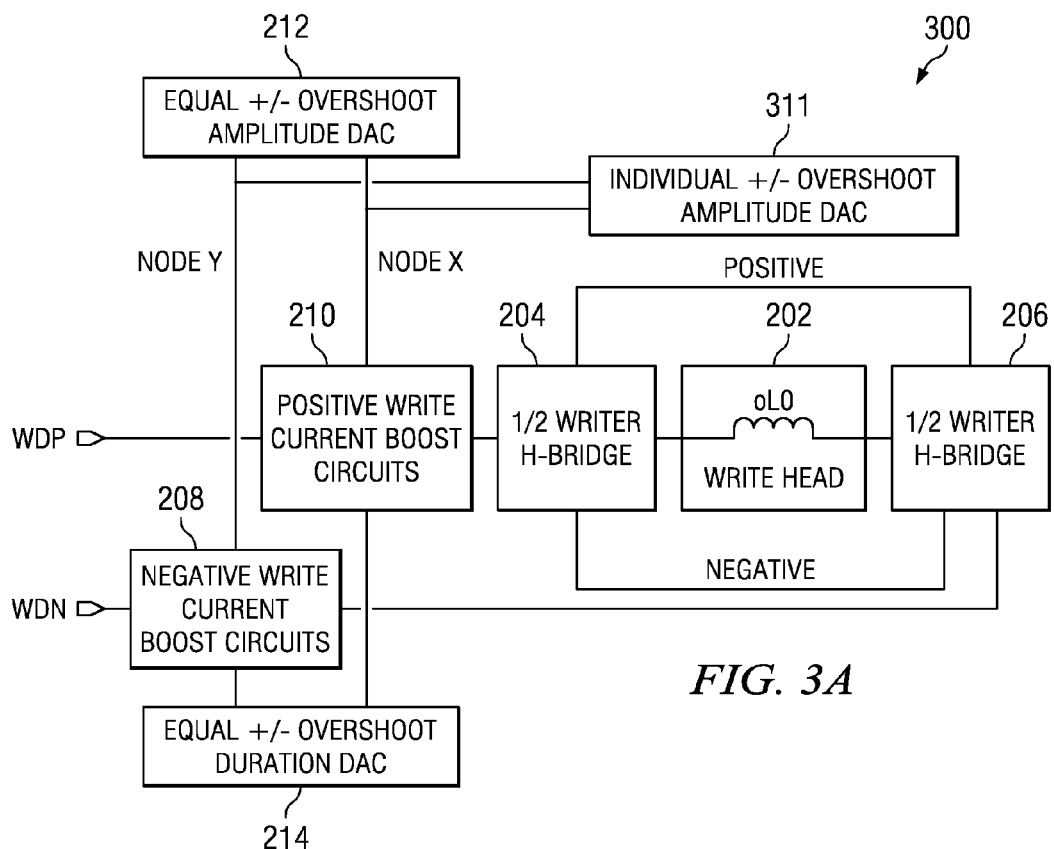
FIG. 3A illustrates a write drive circuit with a individual positive and negative programmable write current overshoot AMPLITUDE correction DAC in accordance with exemplary embodiments of the present invention.
Figure 3B:
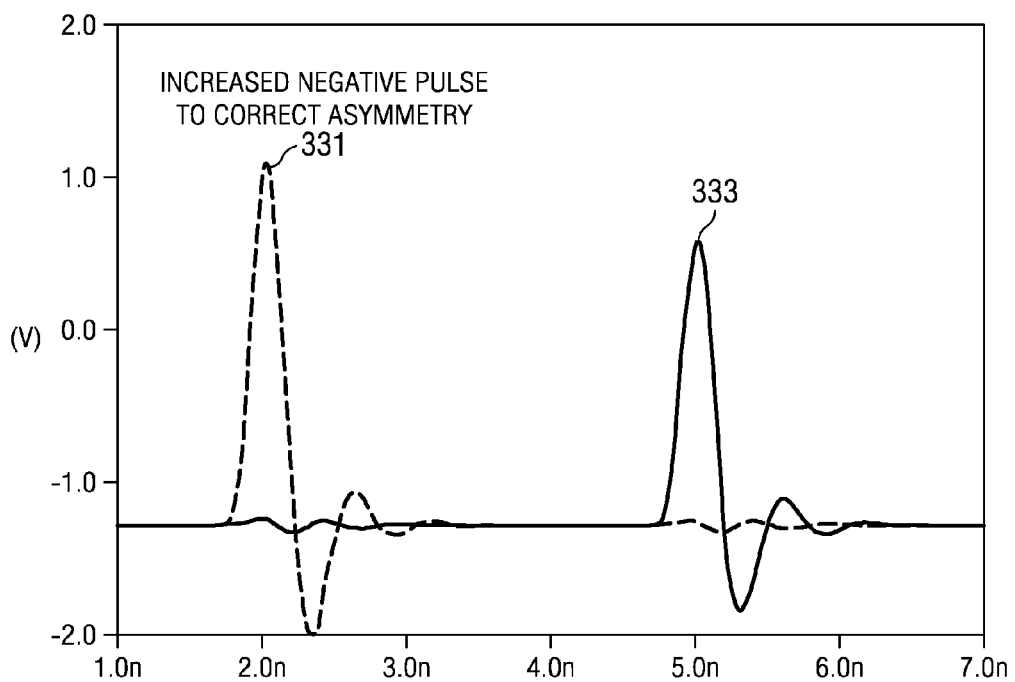
FIG. 3B shows a graphical representation of the write current pulsing signals 331/333 for asymmetrical positive and negative write current overshoot.

Referring now to FIG. 3A there is shown a drive circuit 300 with an individual programmable positive and negative write current overshoot amplitude correction DAC 311 in accordance with exemplary embodiments of the present invention. Further, components of the circuit 300 include items 202, 204, 206, 208, 210, 212 and 214 which are the same as those shown in FIG. 2A. The addition of the individually programmable positive and negative amplitude correction DAC 311 enables the resultant positive edge and negative edge write current overshoot amplitude signals to be individually compensated for. That is, block 311 enables selective programming of the write current overshoot amplitude providing separate tuning for the positive and negative peak write current overshoot amplitude value. Referring now to FIG. 3B there is shown the write current overshoot amplitude pulsing signals, seen at node X and Node Y on FIG. 3A, used with the circuit shown in FIG. 3A to individually adjust the positive and negative write current overshoots amplitudes. As shown and described above, separate signals 331 and 333 are used to generate the positive edge and the negative edge write current overshoot amplitude. As shown on FIG. 3B, the write current amplitude pulsing signals are no longer equal in amplitude thus purposefully introducing a non-symmetrical write current overshoot amplitude allowing the user to compensate for system induced write current overshoot asymmetries, for example.

Figure 3C:
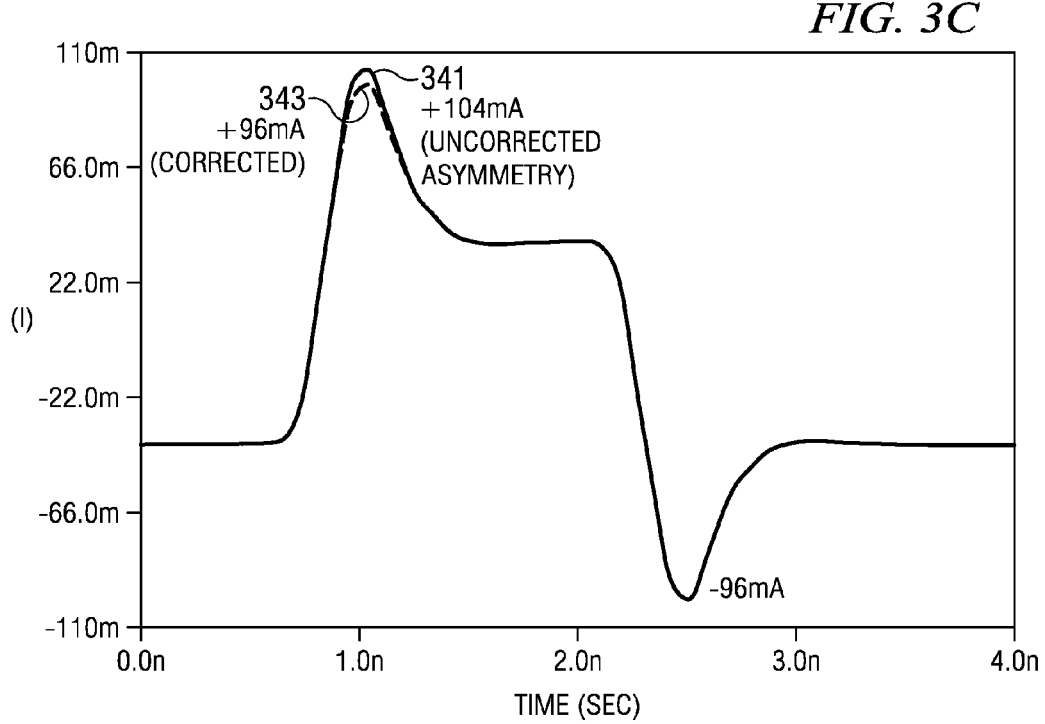
FIG. 3C shows a graphical representation of a corrected and uncorrected write current signal with write current overshoot AMPLITUDE asymmetry.

FIG. 3C illustrates a simulated write current having a waveform 341 with a +6 mA asymmetry on the positive edge write current overshoot and a resultant waveform 343 in which the positive edge amplitude of the positive write current overshoot signal has been adjusted via the individual programmable positive and negative amplitude correction DAC 311 of the present invention until the asymmetry was removed. Range for individual amplitude programmability is determined by the system requirements but typically +/−20% of the programmed equal amplitude is enough to compensate for system induced asymmetries.

Figure 4A:
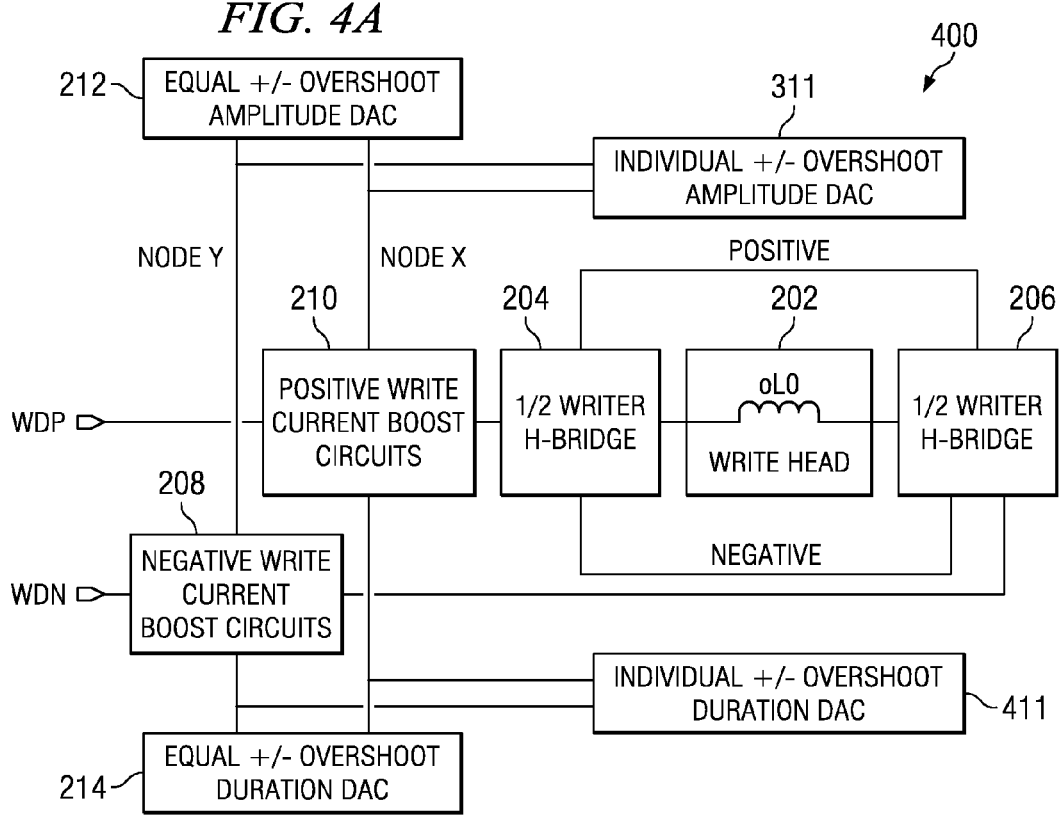
FIG. 4A illustrates a write drive circuit with a individual positive and negative programmable write current overshoot DURATION correction DAC in accordance with exemplary embodiments of the present invention.

Referring now to FIG. 4A there is shown another exemplary embodiment including the addition of an individual programmable positive and negative write current overshoot duration correction DAC 411. Further, components of the circuit 400 include items 202, 204, 206, 208, 210, 212, 214 and 311 which are the same as those shown in FIG. 3A. The addition of the individually programmable positive and negative duration correction DAC 411 is added to enable the resultant positive edge and negative edge write current overshoot duration signals to be individually compensated for. That is, block 411 enables selective programming of the write current overshoot duration providing separate tuning for the positive and negative peak write current overshoot duration value. This enables a user to not only selectively program the amplitude separately for each of the positive and negative amplitudes of the write current overshoot signal but also selectively program the duration separately for each of the positive and negative durations of the write current overshoot signal.

Figure 4B:
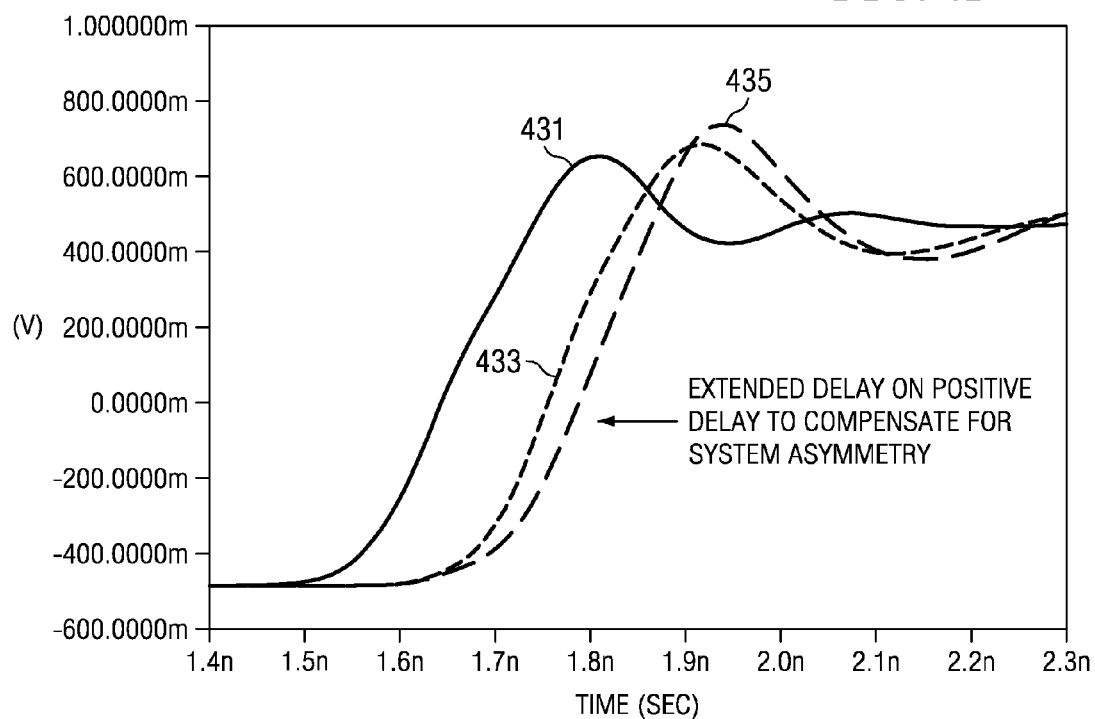
FIG. 4B shows a graphical representation of individually delayed positive and negative write current overshoot duration signals for a write current signal with asymmetrical positive and negative write current overshoot duration.

Referring now to FIG. 4B there is shown positive edge and negative edge write current overshoot duration control signals that are internal signals to block 208 and 210 on FIG. 4A, used to generate the positive and negative write current overshoot durations. As shown and described above, separate signals 433 and 435 are individually delayed versions of the reference signal 431 and used to generate the positive edge and the negative edge write current overshoot duration. As shown on FIG. 4B, the write current duration control signals are no longer equal in amplitude thus purposefully introducing a non-symmetrical write current overshoot duration allowing the user to compensate for system induced write current overshoot duration asymmetries, for example.

Figure 4C:
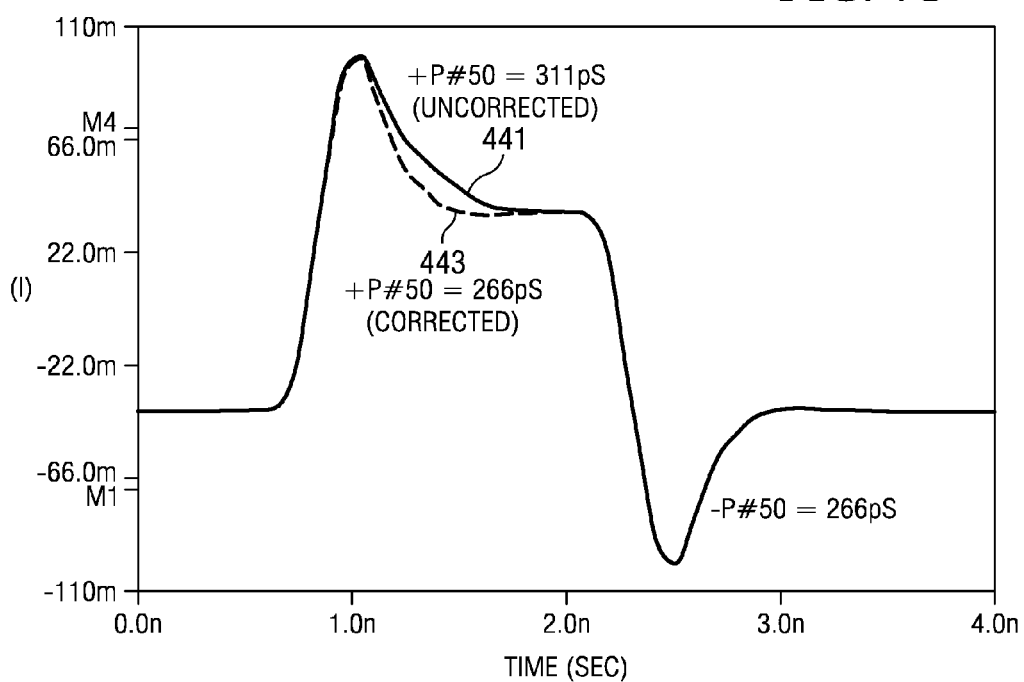
FIG. 4C shows a graphical representation of a corrected and uncorrected write current signal with write current overshoot DURATION asymmetry.

FIG. 4C illustrates a simulated write current having a waveform 441 with a 45 pS write current overshoot duration asymmetry and a resultant waveform 443 in which the duration of the positive write current overshoot signal has been adjusted via the individual duration control circuit 411 of the present invention until the asymmetry was removed. Range for individual duration programmability is determined by the system requirements but typically +/−20% of the equally programmed duration is enough to compensate for system induced asymmetries.

To summarize, a system and/or method is provided for correcting the inherent imbalance associated with the read/write head interconnects which cause unbalanced loading on the differential write data path in which this unbalanced loading induces an asymmetry in the write current overshoot signal amplitude and duration. An asymmetrical write current introduces unwanted jitter into the write data and ultimately degrades the bit error rate of the signal. The write driver overshoot current signal is programmed to counter-act system induced imbalances in the write signal.

Although exemplary embodiments of the invention are described above in detail, this does not limit the scope of the invention, which can be practiced in a variety of embodiments.

What is claimed is:

1. A write current circuit for a mass media write head, comprising:
    a head write driver circuit adapted to drive the write head with a write current signal having a positive write edge and a negative write edge; and
    a circuit coupled with the head write driver circuit and adapted to selectively provide:
        first pulsing signals which individually define overshoot amplitudes of said positive write edge and said negative write edge respectively of said write current signal, and
        second pulsing signals which individually define overshoot duration of said positive write edge and said negative write edge respectively of said write current signal.

2. The write current circuit of claim 1, wherein said further circuit is a differential current source.

3. The write current circuit of claim 2, wherein said differential current source is programmable.

4. The write current circuit of claim 1, wherein said further circuit is adapted to selectively provide a defined amplitude.

5. The write current circuit of claim 4, wherein said further circuit is programmable for providing differential overshoot amplitudes for said positive write edge and said negative write edge.

6. The write current circuit of claim 1, wherein said further circuit includes a delay circuit for selectively providing a defined pulse width for each of said overshoots.

7. The write current circuit of claim 6, wherein said delay circuit is programmable for providing differential overshoot pulse widths for said positive write edge and said negative write edge.

8. The write current circuit of claim 1, wherein said further circuit is adapted to selectively provide a defined amplitude of each of said overshoots and includes a delay circuit for providing a defined pulse width for each of said overshoots.

9. The write current circuit of claim 8, wherein said further circuit and said delay circuit are programmable for providing differential overshoot amplitudes and pulse widths for said positive write edge and said negative write edge.

10. A write driver for an inductive head element in a disk drive system, said driver comprising:
    an H-bridge circuit capable of driving a first current and a second current through said head element;
    a boost circuit coupled with said H-bridge and operable for delivering a current pulse during time periods defining a positive edge of said first current and a negative edge of said first current responsive to a control signal, wherein a sum of said first current and said second current provides the write current for said head element; and
    said boost circuit is further adapted to selectively vary said positive edge current pulse and said negative edge current pulse; and
    a circuit coupled with the head write driver circuit and adapted to selectively provide:
        first pulsing signals which individually define overshoot amplitudes of said positive write edge and said negative write edge respectively of said write current signal, and
        second pulsing signals which individually define overshoot duration of said positive write edge and said negative write edge respectively of said write current signal.

11. The write driver of claim 10, wherein said boost circuit includes a programmable differential current source.

12. The write driver of claim 10, wherein said boost circuit is further adapted to selectively provide a defined amplitude for each of said positive edge current pulse and said negative edge current pulse.

13. The write driver of claim 12, wherein said boost circuit is programmable for providing differential amplitudes for said positive edge current pulse and said negative edge current pulse.

14. The write driver of claim 10, wherein said boost circuit further includes a delay circuit for selectively providing a defined pulse width for each of said positive edge current pulse and said negative edge current pulse.

15. The write driver of claim 14, wherein said delay circuit is programmable for providing differential pulse widths for said positive edge current pulse and said negative edge current pulse.

16. The write driver of claim 10, wherein said boost circuit is further adapted to selectively provide a defined amplitude for each of said positive edge current pulse and said negative edge current pulse and further includes a delay circuit for selectively providing a defined pulse width for each of said positive edge current pulse and said negative edge current pulse.

17. The write driver of claim 16, wherein said boost circuit and said delay circuit are programmable for providing differential amplitudes and pulse widths for said positive edge current pulse and said negative edge current pulse.

* * * * *